(12) United States Patent
Livengood

(10) Patent No.: US 6,666,478 B2
(45) Date of Patent: Dec. 23, 2003

(54) STEERING COLUMN

(75) Inventor: Gregory B. Livengood, Greenfield, IN (US)

(73) Assignee: TRW Inc., Lyndhurst, OH (US)

( * ) Notice: Subject to any disclaimer, the term of this patent is extended or adjusted under 35 U.S.C. 154(b) by 19 days.

(21) Appl. No.: 10/136,598

(22) Filed: May 1, 2002

(65) Prior Publication Data

US 2003/0205893 A1 Nov. 6, 2003

(51) Int. Cl.[7] .................................. B62D 1/18
(52) U.S. Cl. ..................... 280/775; 74/493; 74/526; 74/527
(58) Field of Search .................... 280/775; 74/493, 74/492, 491, 527, 526

(56) References Cited

U.S. PATENT DOCUMENTS

| | | |
|---|---|---|
| 5,131,287 A | 7/1992 | Stromberg |
| 5,259,264 A | 11/1993 | Bodin et al. |
| 5,606,891 A | 3/1997 | Tisell et al. |
| 5,626,059 A | 5/1997 | Bobbitt, III et al. |
| 5,678,454 A * | 10/1997 | Cartwright et al. ........... 74/493 |
| 6,363,810 B2 * | 4/2002 | Danielsson .................. 74/493 |
| 6,419,269 B1 * | 7/2002 | Manwaring et al. ........ 280/775 |
| 6,474,189 B1 * | 11/2002 | Koellisch et al. ............. 74/493 |

* cited by examiner

Primary Examiner—Charles T. Jordan
Assistant Examiner—T. Nguyen
(74) Attorney, Agent, or Firm—Tarolli, Sundheim, Covell & Tummino L.L.P.

(57) ABSTRACT

A steering column (10) includes a support (24) through which a steering column member (12) extends. An over-center locking mechanism (130) locks the support (24) in any one of a plurality of positions relative to a mounting bracket (66). The locking mechanism (130) has a locking member (132) that has a first position in which a portion (46) of the support (24) and a portion (72) of the mounting bracket (66) are urged toward each other to prevent movement of the support (24) relative to the mounting bracket (66). The locking member (132) has a second position in which the support (24) and the mounting bracket (66) are movable relative to each other. The locking mechanism (130) applies a first force to the locking member (132) to move the locking member from the first position to the second position and applies a second force to the locking member to move the locking member from the second position to the first position. The locking mechanism (130) only applies a force to the locking member (132) to move the locking member between the first and second positions.

17 Claims, 2 Drawing Sheets

STEERING COLUMN

FIELD OF THE INVENTION

The present invention relates to a steering column, and more specifically, to an adjustable steering column.

BACKGROUND OF THE INVENTION

A known steering column is disclosed in U.S. Pat. No. 5,259,264. U.S. Pat. No. 5,259,264 discloses an adjustable steering column having a locking mechanism. The locking mechanism includes a spring device on a shaft between packages of plates. Levers are located between the spring device and the packages of plates. The spring device urges first ends of the levers away from each other to lock the steering column in position. A cable pulls second ends of the levers toward each other to permit adjustment of the steering column. Accordingly, the steering column is locked in position by the force applied by the spring device.

SUMMARY OF THE INVENTION

A steering column of the present invention includes a steering column member connectable with a steering wheel and rotatable to turn steerable vehicle wheels. A mounting bracket connects the steering column to a vehicle frame. A support through which the steering column member extends is connected with the mounting bracket. The support supports the steering column member for rotation about a longitudinal axis of the steering column member and is movable relative to the mounting bracket.

An over-center locking mechanism locks the support in any one of a plurality of positions relative to the mounting bracket. The locking mechanism has at least one locking member that urges a portion of the support and a portion of the mounting bracket toward each other to prevent movement of the support relative to the mounting bracket. The locking member has a first position in which the portion of the support and the portion of the mounting bracket are urged toward each other to prevent movement of the support relative to the mounting bracket. The locking member has a second position in which the support and the mounting bracket are movable relative to each other. The locking mechanism applies a first force to the locking member to move the locking member from the first position to the second position and applies a second force to the locking member to move the locking member from the second position to the first position. The locking mechanism only applies a force to the locking member to move the locking member between the first and second positions.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF THE INVENTION

Figure 1:
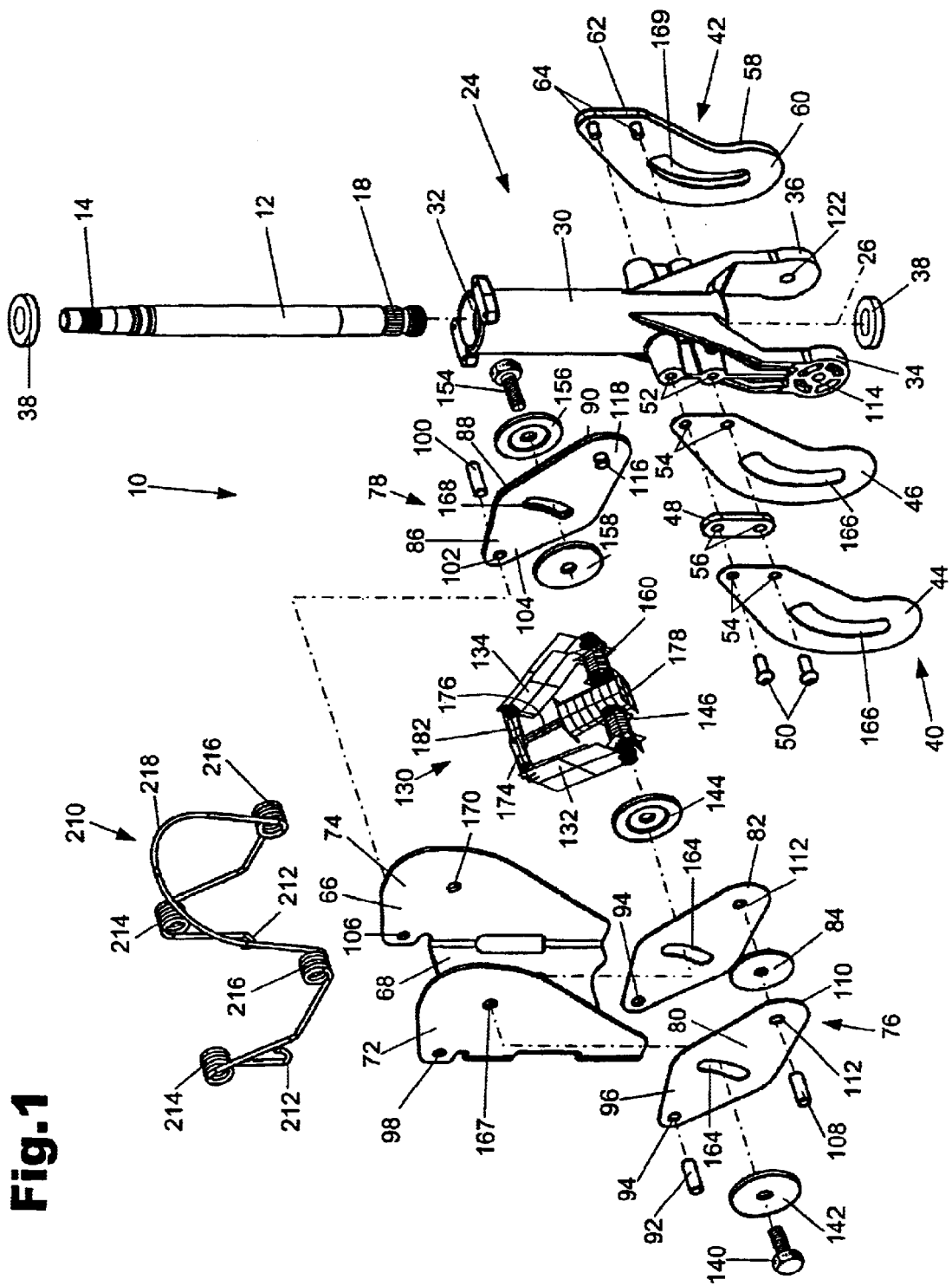
FIG. 1 is an exploded view of a steering column constructed in accordance with the present invention.
Figure 2:
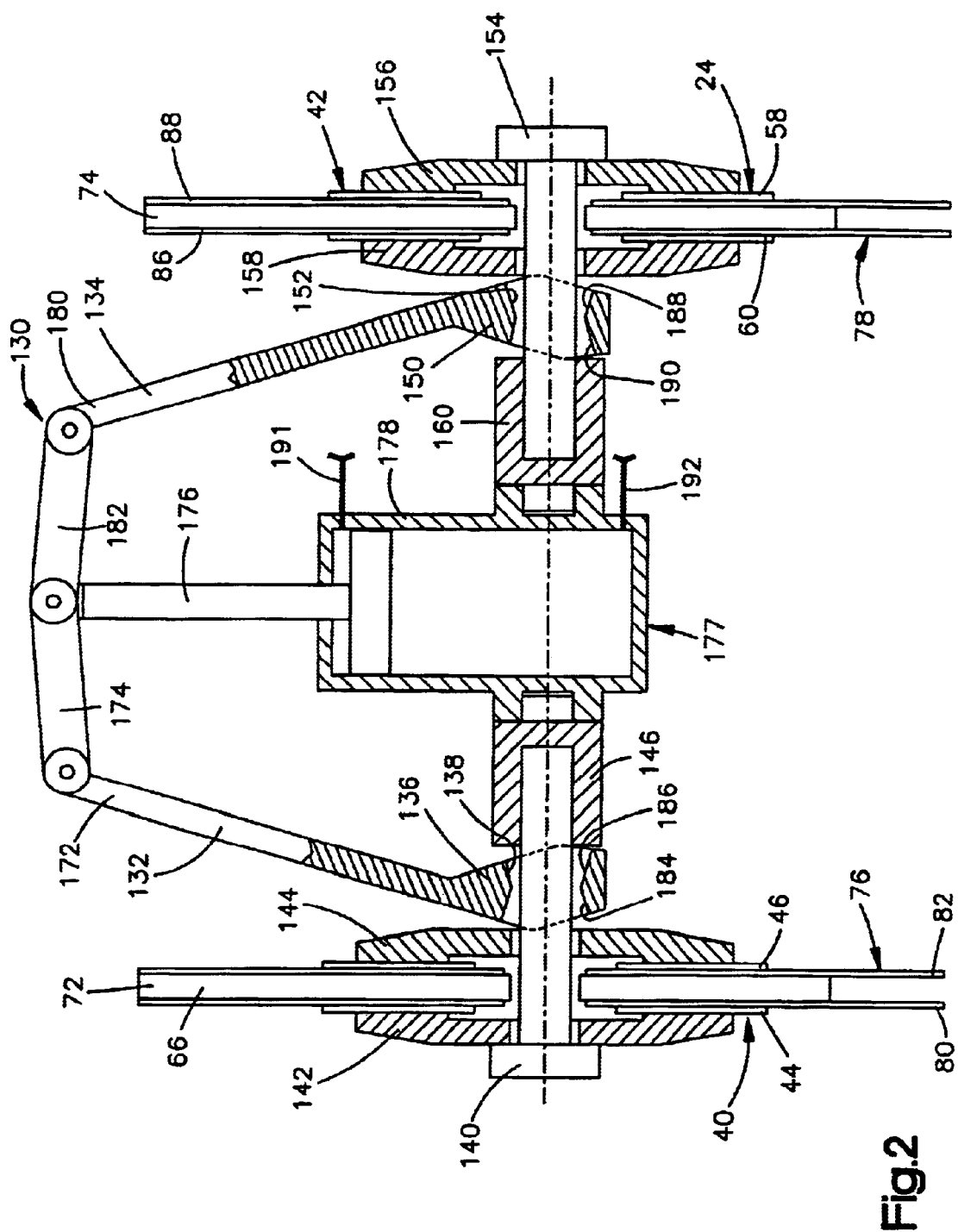
FIG. 2 is a cross-sectional view of a locking mechanism of the steering column of FIG. 1.

A vehicle steering column 10 constructed according to the present invention is illustrated in FIGS. 1 and 2. The steering column 10 (FIG. 1) includes a rotatable steering column member 12 to turn steerable vehicle wheels (not shown). The steering column member 12 has an end 14 connectable with a steering wheel (not shown) in manner known in the art.

An end 18 of the steering column member 12 opposite from the end 14 is connectable with a universal joint (not shown). The universal joint connected with the end 18 of the steering column member 12 is connectable with a mechanism designed to transmit movement of the steering column member to a steering gear and permit movement of the steering column member relative to the mechanism, as known in the art.

A support 24 supports the steering column member 12 for rotation about a longitudinal axis 26 of the steering column member. Upon rotation of the steering wheel, the steering column member 12 rotates about the longitudinal axis 26. Upon rotation of the steering column member 12 about the longitudinal axis 26, steerable vehicle wheels (not shown) are turned, as known in the art.

The support 24 has a tubular portion 30 with a passage 32 through which the steering column member 12 extends. Arm portions 34 and 36 extend axially from the tubular portion 30. The tubular portion 30 is made by casting and may have any desired shape. Bearings 38 located in the passage 32 support the steering column member 12 for rotation about the axis 26 relative to the support 24.

The support 24 includes locking portions 40 and 42 extending from opposite sides of the tubular portion 30. The locking portion 40 includes plates 44 and 46 fixedly connected to each other with a spacer 48 between them. The locking portion 40 is fixedly connected to the tubular potion 30 by fasteners 50, such as screws. The fasteners 50 threadably engage openings 52 in the tubular portion 30 and extend through openings 54 in the plates 44 and 46 and through openings 56 in the spacer 48.

The locking portion 42 is identical to locking portion 40 and, therefore, will not be described in detail. The locking portion 42 includes plates 58 and 60 fixedly connected to each other with a spacer 62 between them. The locking portion 42 is fixedly connected to the tubular potion 30 by fasteners 64, such as screws. The fasteners 64 threadably engage openings in the tubular portion 30 and extend through openings in the plates 58 and 60 and through openings in the spacer 62.

A mounting bracket 66 connects the steering column 10 with a vehicle frame. The mounting bracket 66 has a rear wall 68 with openings for receiving fasteners to connect the mounting bracket to the vehicle frame. The mounting bracket 66 is connected to the vehicle frame using fasteners, such as bolts, as known in the art.

A pair of side walls or side portions 72 and 74 extend from the rear wall 68 of the mounting bracket 66. The side walls 72 and 74 extend generally perpendicular to the rear wall 68 and parallel to each other. A pair of identical arms 76 and 78 interconnect the support 24 and the mounting bracket 66. The arm 76 includes a pair of plates 80 and 82 fixedly connected together with a washer 84 between them. The side wall 72 of the mounting bracket 66 extends between the plates 80 and 82. The arm 78 includes a pair of plates 86 and 88 fixedly connected together with a washer 90 between them. The side wall 74 of the mounting bracket 66 extends between the plates 86 and 88.

A pin 92 extends through openings 94 in an end 96 of the arm 76. The pin 92 is received in an opening 98 in the side wall 72 to pivotally connect the arm 76 to the side wall 72.

A pin 100 extends through openings 102 in an end 104 of the arm 78. The pin 100 is received in an opening 106 in the side wall 74 to pivotally connect the arm 78 to the side wall 74. Accordingly, the arms 76 and 78 can pivot relative to the mounting bracket 66.

A pin 108 pivotally connects an end 110 of the arm 76 to the support 24. The pin 108 extends through openings 112 in the end 110 and the washer 84 and into an opening 114 in the arm portion 34 of the support 24. A pin 116 pivotally connects an end 118 of the arm 78 with the arm portion 36 of the support 24. The pin 116 extends through openings in the end 118 and the washer 90 and into an opening 122 in the support 24. Accordingly, the support 24 can pivot relative to the arms 76 and 78.

An over-center locking mechanism 130 locks the arms 76 and 78 in any one of a plurality of pivot positions relative to the mounting bracket 66. The locking mechanism 130 also locks the support 24 in any one of a plurality of pivot positions relative to the arms 76 and 78. The locking mechanism 130 applies a force to clamp the arm 76 and the side wall 72 of the mounting bracket 66 between the plates 44 and 46 of the locking portion 40 of the support 24. The locking mechanism 130 clamps the arm 78 and the side wall 74 of the mounting bracket 66 between the plates 58 and 60 of the locking portion 42 of the support 24.

The over-center locking mechanism 130 (FIGS. 1 and 2) includes locking members 132 and 134 that apply a force to the plates 46 and 60 of the locking portions 40 and 42 of the support 24 when the locking members are in first or locking positions. The locking member 132 (FIG. 2) has an end 136 with an opening 138 through which a locking shaft or bolt 140 extends. The bolt 140 also extends through washers 142 and 144. The washer 144 is located between the end 136 and the plate 46 of the support 24. The bolt 140 threadably engages a cylindrical member 146 (FIGS. 1 and 2). The locking member 134 (FIG. 2) has an end 150 with an opening 152 through which a locking shaft or bolt 154 extends. The bolt 154 also extends through washers 156 and 158. The washer 158 is located between the end 150 and the plate 60 of the support 24. The bolt 154 threadably engages a cylindrical member 160 (FIGS. 1 and 2).

The bolt 140 (FIG. 1) extends through arcuate slots 164 in the arm 76 and arcuate slots 166 in the locking portion 40 of the support 24. The arcuate slots 164 in the arm 76 are located between the ends 96 and 110 of the arm 76. The bolt 140 also extends through opening 167 in the side wall 72 of the mounting bracket 66. The bolt 154 extends through arcuate slots 168 in the arm 78 and arcuate slots 169 in the locking portion 42 of the support 24. The bolt 154 also extends through opening 170 in the side wall 74 of the mounting bracket 66.

The locking member 132 (FIG. 2) has an end 172 pivotally connected with an actuation lever 174 that transfers force to the locking member 132. The actuation lever 174 is pivotally connected with a piston 176 of a moving mechanism or linear actuator 177. The piston 176 extends into a cylinder 178 and is movable relative to the cylinder. The cylindrical members 146 and 160 extend radially from the cylinder 178. The locking member 134 has an end 180 pivotally connected with an actuation lever 182 that transfers force to the locking member 134. The actuation lever 182 is pivotally connected with the piston 176. Accordingly, when the piston 176 moves within the cylinder 178, the actuator levers 174 and 182 pivot relative to the piston and the locking members 132 and 134 pivot relative to the actuation levers. Although the linear actuator 177 is shown as having a piston 176 movable in a cylinder 178, it is contemplated that the linear actuator could have any construction, such as a push-pull manual cable, an electric motor, electric solenoid, or a hydraulic cylinder.

The opening 138 (FIG. 2) in the end 136 of the locking member 132 has tapered axial ends 184 and 186 to permit movement of the locking member 132 relative to the bolt 140. The end 136 has a first dimension extending between the cylindrical member 146 and the washer 144 when the locking member 132 is in the first or locking position, as shown in FIG. 2. The end 136 urges the cylindrical member 146 and the washer 144 away from each other when in the locking position. The end 136 has a second dimension smaller than the first dimension that extends between the cylindrical member 146 and the washer 144 when the locking member 132 is in a second or release position.

The opening 152 in the end 150 of the locking member 134 has tapered axial ends 188 and 190 to permit movement of the locking member 134 relative to the bolt 154. The end 150 has a first dimension extending between the cylindrical member 160 and the washer 158 when the locking member 134 is in the first or locking position, as shown in FIG. 2. The end 150 urges the cylindrical member 160 and the washer 158 away from each other when in the locking position. The end 150 has a second dimension smaller than the first dimension extending between the cylindrical member 160 and the washer 158 when the locking member 134 is in a second or release position. When the locking members 132 and 134 are in the second positions, the support 24 can be moved relative to the mounting bracket 66.

The cylinder 178 (FIG. 2) has ports 191 and 192 for receiving pressurized fluid, such as air. The ports 191 and 192 are located at opposite axial ends of the cylinder 178 to apply pressurized fluid to opposite sides of the piston 176 and move the piston relative to the cylinder. Pressurized fluid is applied to opposite sides of the piston 176 to move the piston between a first or locked position and a second or released position. When the piston 176 is in the locked position, the locking members 132 and 134 are in the locking positions as shown in FIG. 2. When the piston 176 is in the release position, the locking members 132 and 134 are in the release positions.

The linear actuator 177 applies a first force to the locking members 132 and 134 to move the locking members from the first or locking positions to the second or release positions. The linear actuator 177 applies a second force to move the locking members 132 and 134 from the release positions to the locking positions. The linear actuator 177 only applies force to the locking members 132 and 134 to move the locking members between the locking and release positions. Accordingly, the locking mechanism 130 does not have a spring for applying a locking force.

A spring member 210 (FIG. 1) urges the support 24 to pivot in a counterclockwise direction, as viewed in FIG. 1, relative to the arms 76 and 78 and the arms to pivot in a counterclockwise direction relative to the mounting bracket 66. The spring member 210 has ends 212 that engage the mounting bracket 66 to connect the spring member to the mounting bracket. Coiled portions 214 of the spring member 210 extend around and engage the pins 92 and 100. Coiled portions 216 extend around and engage the pins 108 and 116. A curved portion 218 of the spring member 210 extends between the coiled portions 216 and engages the support 24. The spring member 210 urges the support 24 into an out of the way position. Although the spring member 210 is shown as having coiled portions 214 and 216 and curved portion 218, it is contemplated that any mechanism may be used to urge the support 24 to the out of the way position. It is also contemplated that the support 24 may not be urged to the out of the way position.

When pressurized fluid is applied to the port 191 in the cylinder 178, the piston 176 moves the locking members 132 and 134 from the locking positions to the release positions in which the support 24 can be moved relative to the mounting bracket 66. Once the locking members 132 and 134 have been moved to the release positions, pressurized fluid is not applied to the piston 176. The locking members 132 and 134 remain in the release positions until pressurized fluid is applied to the port 192. When pressurized fluid is applied to the port 192, the piston 176 moves the locking members 132 and 134 from the release positions to the locking positions to prevent movement of the support 24 relative to the mounting bracket 66. Once the locking members 132 and 134 have been moved to the locking positions, pressurized fluid is not applied to the piston 176.

When the locking members 132 and 134 are in the release positions, the arms 76 and 78 move relative to the bolts 140 and 154 and the mounting bracket 66 The bolts 140 and 154 are engageable with opposite ends of the arcuate slots 164, 168 in the arms 76 and 78 and with opposite ends of the arcuate slots 166, 169 in the locking portions 40 and 42 of the support 24 to limit movement of the support and the arms relative to the mounting bracket 66. After the support 24 is positioned relative to the mounting bracket 66, pressurized fluid is applied to the port 192 in the cylinder 178. The pressurized fluid moves the piston 176 relative to the cylinder 178 and the locking members 132 and 134 from the release positions to the locking positions. After the locking members 132 and 134 have moved to the locking positions, pressurized fluid is not applied to the piston 176. The locking members 132 and 134 remain in the locking positions until pressurized fluid is applied to the port 191.

Although the locking mechanism 130 is shown in a steering column 10 with arms 76 and 78 and support 24 with locking portions 40 and 42, it is contemplated that the locking mechanism could be used in any steering column to prevent movement of a support relative to a mounting bracket.

From the above description of the invention, those skilled in the art will perceive improvements, changes and modifications. Such improvements, changes and modifications within the skill of the art are intended to be covered by the appended claims.

Having described the invention, the following is claimed:

1. A steering column comprising:
    a steering column member connectable with a steering wheel and rotatable to turn steerable vehicle wheels;
    a mounting bracket that connects said steering column to a vehicle frame;
    a support connected with said mounting bracket through which said steering column member extends, said support supporting said steering column member for rotation about a longitudinal axis of said steering column member and being movable relative to said mounting bracket; and
    an over-center locking mechanism that locks said support in any one of a plurality of positions relative to said mounting bracket, said locking mechanism having at least one locking member that urges a portion of said support and a portion of said mounting bracket toward each other to prevent movement of said support relative to said mounting bracket, said locking member having a first position in which said portion of said support and said portion of said mounting bracket are urged toward each other to prevent movement of said support relative to said mounting bracket and a second position in which said support and said mounting bracket are movable relative to each other, said locking mechanism applying a first force to said locking member to move said locking member from said first position to said second position and applying a second force to said locking member to move said locking member from said second position to said first position, said locking mechanism only applying a force to said locking member to move said locking member between said first and second positions.

2. A steering column as set forth in claim 1 wherein said locking member has an end extending between first and second members, said locking member urging said first and second members away from each other when in said first position to urge said portion of said mounting bracket and said portion of said support toward each other to prevent movement of said support relative to said mounting bracket.

3. A steering column as set forth in claim 2 wherein said end of said locking member has a first dimension extending between said first and second members when said locking member is in said first position and a second dimension extending between said first and second members when said locking member is in said second position, said first dimension being larger than said second dimension.

4. A steering column as set forth in claim 3 wherein said locking mechanism further includes a locking shaft extending through said portion of said mounting bracket and said portion of said support, said locking shaft extending through said end of said locking member, said locking member being movable relative to said locking shaft between said first and second positions.

5. A steering column as set forth in claim 4 wherein said end of said locking member has an opening through which said locking shaft extends, said opening having first and second tapered axial ends.

6. A steering column as set forth in claim 1 further including a moving mechanism that applies said first and second forces to move said locking member between said first and second positions and an actuation lever pivotally connected with said locking member to transfer said first and second forces from said moving mechanism to said locking member.

7. A steering column as set forth in claim 6 wherein said moving mechanism that moves said actuation lever is pivotally connected with said actuation lever to move said actuation lever and said locking member between said first and second positions.

8. A steering column as set forth in claim 7 wherein said moving mechanism is a linear actuator.

9. A steering column as set forth in claim 8 wherein said linear actuator includes a piston movable within a cylinder, one of said piston and said cylinder being pivotally connected with said actuation lever, pressure being applied to opposite sides of said piston to move said piston and said cylinder relative to each other and move said locking member between said first and second positions.

10. A steering column as set forth in claim 1 wherein said locking mechanism includes first and second locking members, said first locking member urging a first portion of said support and a first portion of said mounting bracket toward each other to prevent movement of said support relative to said mounting bracket, said second locking member urging a second portion of said support and a second portion of said mounting bracket toward each other to prevent movement of said support relative to said mounting bracket, said first locking member having a first position in which said first portion of said support and said first portion of said mounting bracket are urged toward each other to prevent movement of said support relative to said mounting bracket and a second position in which said support and said mounting bracket are movable relative to each other, said second locking member having a first position in which said second portion of said support and said second portion of said mounting bracket are urged toward each other to prevent movement of said support relative to said mounting bracket and a second position in which said support and said mounting bracket are movable relative to each other, said locking mechanism applying a first force to said first locking member to move said first locking member from said first position to said second position and applying a second force to said first locking member to move said first locking member from said second position to said first position, said locking mechanism applying a first force to said second locking member to move said second locking member from said first position to said second position and applying a second force to said second locking member to move said second locking member from said second position to said first position, said locking mechanism only applying force to said first and second locking members to move said first and second locking members between said first and second positions of said first and second locking members.

11. A steering column as set forth in claim 10 wherein said first locking member has an end extending between first and second members, said first locking member urging said first and second members away from each other when in said first position to urge said first portion of said mounting bracket and said first portion of said support toward each other, said second locking member having an end extending between third and fourth members, said second locking member urging said third and fourth members away from each other when in said first position to urge said second portion of said mounting bracket and said second portion of said support toward each other.

12. A steering column as set forth in claim 11 wherein said locking mechanism further includes a first locking shaft extending through said first portion of said mounting bracket and said first portion of said support, said first locking shaft extending through said end of said first locking member, said first locking member being movable relative to said first locking shaft between said first and second positions, said locking mechanism further including a second locking shaft extending through said second portion of said mounting bracket and said second portion of said support, said second locking shaft extending through said end of said second locking member, said second locking member being movable relative to said second locking shaft between said first and second positions.

13. A steering column as set forth in claim 10 further including a moving mechanism that applies said first and second forces to move said first and second locking members between said first and second positions, a first actuation lever pivotally connected with said first locking member to transfer said first and second forces that move said first locking member to said first locking member from said moving mechanism and a second actuation lever pivotally connected with said second locking member to transfer said first and second forces that move said second locking member to said second locking member from said moving mechanism.

14. A steering column as set forth in claim 13 wherein said moving mechanism is pivotally connected with said first and second actuation levers to move said first and second actuation levers and said first and second locking members between said first and second positions.

15. A steering column as set forth in claim 14 wherein said moving mechanism includes a piston movable within a cylinder, one of said piston and said cylinder being pivotally connected with said first and second levers, pressure being applied to opposite sides of said piston to move said piston and said cylinder relative to each other and move said first and second locking members between said first and second positions.

16. A steering column as set forth in claim 1 wherein said support includes first and second plates, said mounting bracket having a side wall extending between said first and second plates of said support, said locking mechanism clamping said side wall between said first and second plates when said locking member is in said first position.

17. A steering column as set forth in claim 1 further including a pair of arms pivotally connected to said mounting bracket, said support being pivotally connected to said arms, said locking mechanism preventing pivotal movement of said arms relative to said mounting bracket and pivotal movement of said support relative to said arms when said locking member is in said first position.

* * * * *